United States Patent [19]
Pfarr

[11] Patent Number: 5,988,927
[45] Date of Patent: Nov. 23, 1999

[54] BREAKAWAY CONNECTOR SYSTEM FOR ELEMENTS LOADED IN TENSION

[75] Inventor: Craig E. Pfarr, Issaquah, Wash.

[73] Assignee: Designs Systems, Inc., Redmond, Wash.

[21] Appl. No.: 08/807,674

[22] Filed: Feb. 27, 1997

[51] Int. Cl.⁶ .................................................... F16B 27/00
[52] U.S. Cl. .......................... 403/2; 403/32; 403/DIG. 3; 24/115 F
[58] Field of Search .................................. 403/2, 32, 410, 403/DIG. 3, DIG. 4; 24/115 F, 602

[56] References Cited

U.S. PATENT DOCUMENTS

| | | |
|---|---|---|
| 2,020,601 | 11/1935 | Beich . |
| 2,444,007 | 6/1948 | Davis . |
| 3,084,408 | 4/1963 | Ireland . |
| 3,413,692 | 12/1968 | Pressley ..................................... 24/602 |
| 3,744,095 | 7/1973 | Tomlinson . |
| 4,781,666 | 11/1988 | Acee, Sr. . |
| 4,798,569 | 1/1989 | Alderfer . |
| 5,092,823 | 3/1992 | Longo . |
| 5,338,265 | 8/1994 | Kilgar . |
| 5,419,744 | 5/1995 | Kagebeck . |

FOREIGN PATENT DOCUMENTS

| | | | |
|---|---|---|---|
| 2498457 | 7/1982 | France | ...................................... 24/602 |

*Primary Examiner*—Terry Lee Melius
*Assistant Examiner*—William L. Miller
*Attorney, Agent, or Firm*—Christensen O'Connor Johnson & Kindness PLLC

[57] ABSTRACT

A breakaway system (10) for detachably connecting a tension transmitting belt (12) to a pin (20) includes a connector (24) having a pair of jaws (34a, 34b) that clamp against the sides of the pin to preload the connector to the pin thereby preventing relative motion between the jaws and the pin. When the tension load acting between the belt and pin exceeds a threshold level, the jaws of the connector spread sufficiently to allow the pin (20) to pass through an exit gap (42) at the ends of the jaws, which gap is of a nominal width that is smaller than the width of the pin.

13 Claims, 3 Drawing Sheets

BREAKAWAY CONNECTOR SYSTEM FOR ELEMENTS LOADED IN TENSION

FIELD OF THE INVENTION

The present invention relates to systems for connecting elements loaded relative to each other in tension, and more particularly, to a connection system for abruptly disconnecting the first and second elements from each other when the tension load imposed therebetween exceeds a threshold level.

BACKGROUND OF THE INVENTION

Various belts, cables, chains and other "line type" devices are used to apply tension loads on enumerous objects. For instance, a carriage may be moved back and forth along a track by a belt connected to the carriage, with the belt being driven by an electric or hydraulic motor. In such installations, it is desirable that the belt be disengageable from the carriage in emergency situations, for instance, if the carriage becomes jammed or the drive motor does not operate properly. Disengagement of the belt from the carriage can avoid significant damage to the carriage structure and/or to the motor used to drive the belt.

A prior art system for connecting the belt to the carriage includes a pin mounted on the carriage and a connector fastened to the end of the drive belt. The connector includes a pair of jaws that have a tip portion that form an exit gap having a width somewhat smaller than the width of the pin. Inboard of the exit gap is an enlarged slot portion of a width significantly larger than the width of the pin. The pin is engaged in the wider slot portion and then tension is placed on the belt so that the pin nominally seats at the innersection of the wider slot portion and the narrower exit gap. When the load on the belt exceeds a threshold level, the jaws separately sufficiently to permit the pin to pass through the exit gap to disengage the jaws. A drawback of this connection system is that when any significant tension load is placed on the belt, the resilient jaws separate somewhat, but not to the extent to allow the pin to disengage from the jaws. As a result, typically constant movement occurs between the jaws and the exterior of the pin whereby the friction forces acting therebetween cause gauling or other detrimental wear between the jaws and the pin leading eventually to failure of the connection system. This and other drawbacks of prior art connection systems are addressed by the present invention.

SUMMARY OF THE INVENTION

The present invention provides a breakaway connector system for connecting a driven member with a tension member. The connector system includes a first member associated with the driven member and a second member associated with the tension member, with the second member shaped to mate with the first member. Means are provided for applying a clamping load on the first and second members to clamp the first and second members together. The clamping load includes a significant component in the direction substantially perpendicular to the direction of the tension load imposed on the driven member by the tension member. When the tension on the tension member exceeds a threshold level, the clamping means are no longer able to maintain the first and second members clamped together, rather the first and second members abruptly disengage from each other.

In a more specific aspect of the present invention, the first member is a pin and the second member includes a pair of spaced apart jaws configured to snugly receive the pin between the jaws to apply a clamping load on the pin. The tips of the jaws define an exit gap of a width smaller than the width of the pin held between the jaws. When the tension load on the tension member exceeds a threshold level, the jaws of the second member sufficiently spread to permit the pin to pass through the exit gap of the jaws thereby to cause the pin to abruptly breakaway from the jaws.

In accordance with a further aspect of the present invention, the jaws define a seat portion that is configured to match the exterior shape of the pin. The pin is nominally received within the seat member and remains stationary within the seat member during nominal conditions. Only when the tension load on the tension member seeks a threshold level does the pin unseat from the seat portion of jaws to pass through the exit gap defined by the jaws.

In another aspect of the present invention, the pin has a round exterior shape and the seat defined by the jaws define a portion of the circle corresponding to the diameter of the pin.

In accordance with an additional aspect of the present invention, the second member includes a base portion that is configured to match the shape of the corresponding end portion of the tension member to facilitate connection of the tension member to the second member.

In accordance with a further aspect of the present invention, the tension member may include a timing belt, a cog belt, a flat belt, a V-belt or other type of belt. Moreover, the tension member may not be a belt but may be of another configuration, such as a cable, a line, a rope or a chain.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 2:
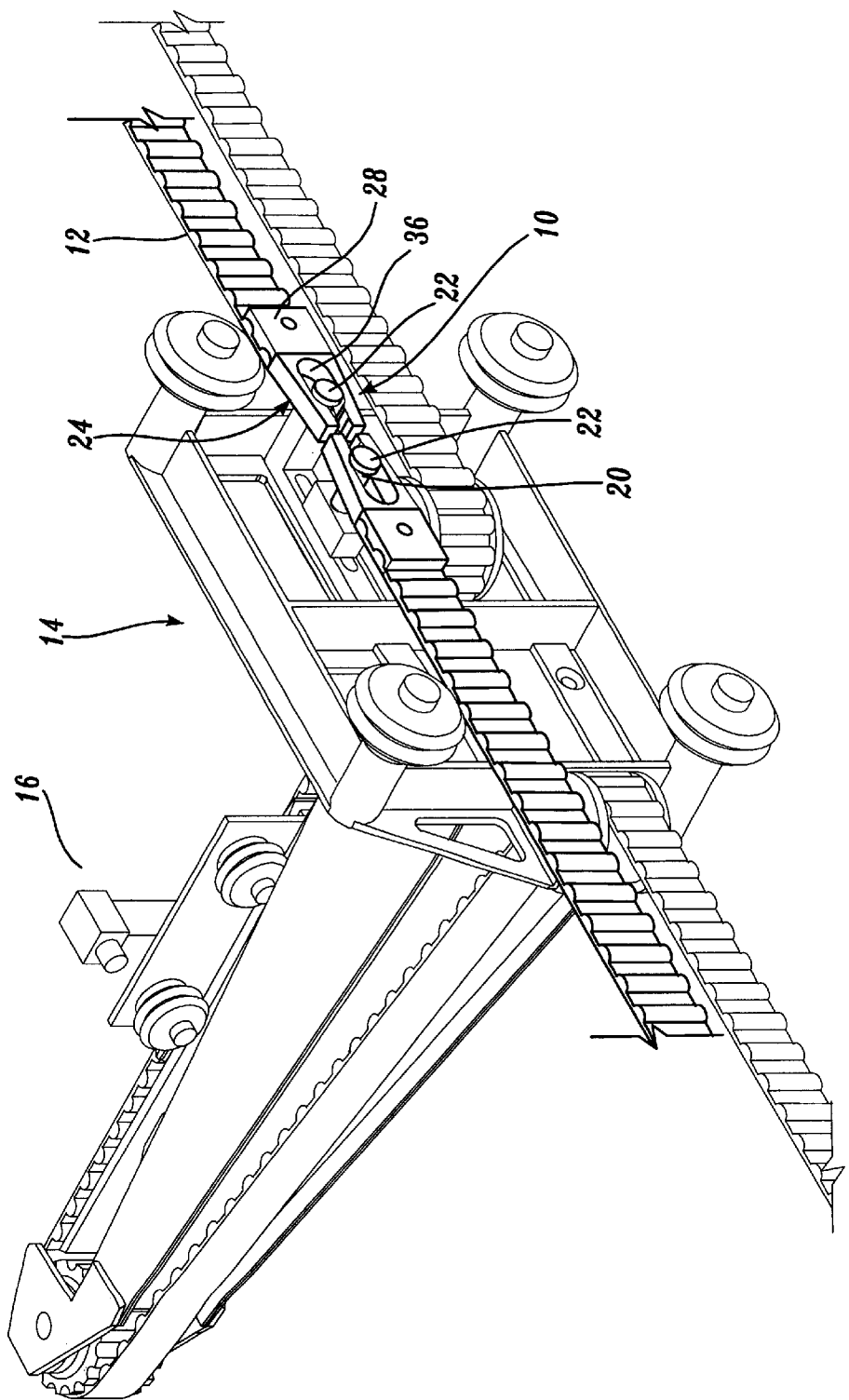
FIG. 2 is a pictorial view of an embodiment of the present invention shown as installed in a carriage drive system.

Referring initially to FIG. 2, the connector system 10 of the present embodiment is used to connect a timing belt 12 to a carriage 14 that rides along a track system, not shown. The carriage is designed to move a machine tool 16 relative to workpieces, not shown, moving on a conveyor, not shown, located beneath the carriage. The timing belt 12 is powered by a motor (not shown) which imparts tension loads on the belt 12 to thereby move the carriage 14 back and forth along its track system.

Figure 3:
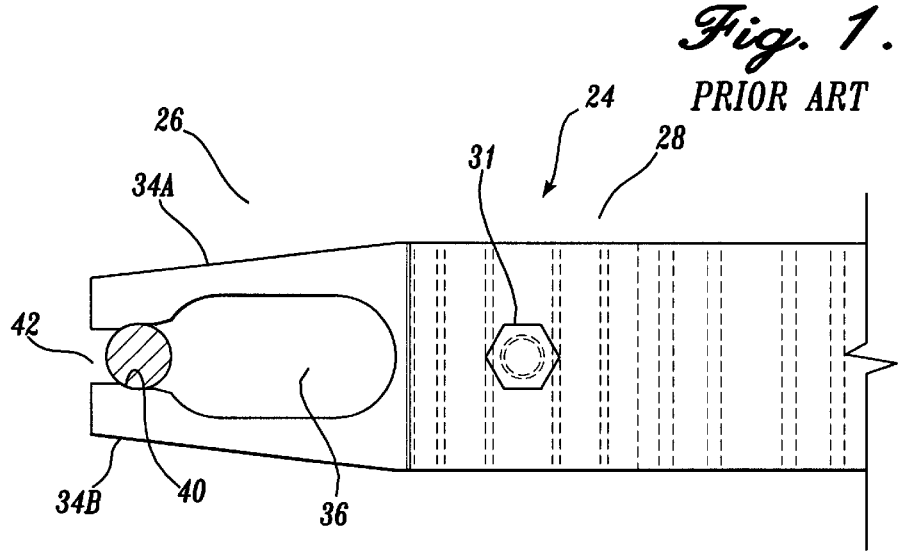
FIG. 3 is a plan view of the present invention.
Figure 4:
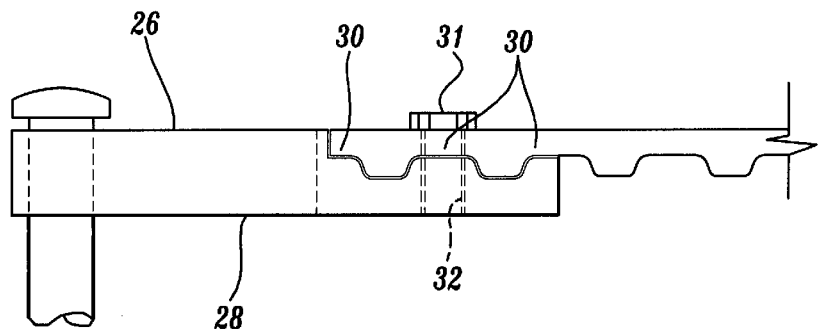
FIG. 4 is an edge view of the connector system shown in FIG. 3.

Referring additionally to FIGS. 3 and 4, the connector system 10 includes pins 20 mounted on the carriage. As shown in FIG. 2, the pins are in the form of circular studs projecting from the carriage. An enlarged retaining head 22 may be formed on the free end of the pins 20. A connector 24 is attached to each end of belt 12 to engage with a corresponding pin 20. Ideally the connector 24 has a substantially flat, generally rectangular shape and is of a maximum width corresponding to the width of belt 12. The connector 24 includes a clamp section 26 that engages the pin 20 and the base section 28 for attachment to the adjacent end portion of belt 12.

As more clearly shown in FIGS. 3 and 4, the base portion includes a series of transverse teeth 30 that match the teeth profile of belt 12. The base section 28 is securely fastened to the belt 12 by a threaded fastener 31 extending through clearance hole formed in the belt and engaging within the threaded hole 32 formed in base section 28.

The clamp section 26 of connector 24 includes a pair of spaced apart jaws 34a and 34b that project longitudinally from base section 28 in spaced apart relationship to each other. The jaws 34a and 34b are shaped to define a substantially oval or oblong slot 36 of a width substantially wider than the diameter of pin 20 and somewhat larger than the diameter of the head 22 of the pin 20 to facilitate initial engagement of the pin with the connector 24.

The clamp section 26 also includes an intermediate seat portion 40 that is shaped in the form of a segment of a circle corresponding to the size of the outer diameter of pin 20. This seat section is sized so as to tightly clamp against the sides of the pin 20 when the pin is disposed within the seat section. The jaws 34a and 34b apply a clamping preload on the pin 20, which preload has a significant load component in the direction perpendicular to the length of the belt 12 and connector 24.

The jaws 34a and 34b define an exit gap 42 at the distal end of clamp section 26. The width of the exit gap is somewhat smaller than the diameter of pin 20.

In operation, the connector 24 is engaged with pin 20 by extending the slot portion 36 of the connector over the head of the pin and then by pulling on the belt 12 to seat the pin 20 within seat section 40. During normal operation, when tension loads are applied on belt 12, such loads cause corresponding movement of the carriage 14 along its track system. During such operation, the jaws 34a and 34b tightly clamp against pin 20 to retain the pin stationary within seat section 40. However, if the carriage 14 becomes bound up or is otherwise prevented from moving along track system 16, it can be appreciated that damage could occur to the carriage, the belt 12, to the motor used to drive the belt or to other components. The connector system 10 is designed to avoid such potential damage by quick release of the connector 24 from the pin 20 once a threshold tension force on the belt 12 has been exceeded. Upon such threshold tension force, the jaws 34a and 34b separate sufficiently to enable the pin 20 to exit seat 40 and slide through the exit gap 42 at the distal/tip ends of the jaws.

Usually the clamp section 26 of connector 24 will be composed of sufficiently strong material and be designed with sufficient structural integrity so that the material comprising the clamp section does not yield when the jaws 34 and 34b spread wide enough to allow the breakaway disconnection of the connector 24 from the pin 20. This allows the connector 24 to be reusable. However, there may be situations where it is desirable to render the connector 24 useless once the connector has disengaged from the pin. This can be easily achieved by designing the geometry of the jaws 34 such that the stress occurring in the jaws during breakaway from the pin 20 exceeds the material yield strength of the clamp section 26.

Figure 1:
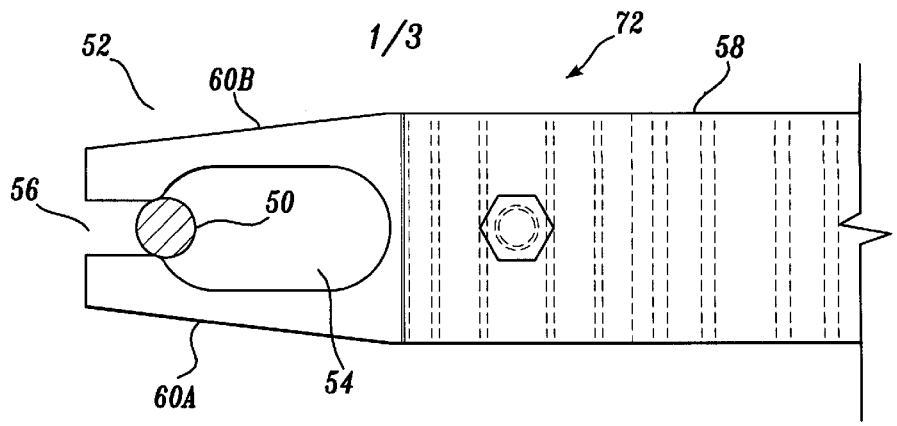
FIG. 1 is a planned view of a prior art connection system.

FIG. 1 illustrates a prior art connector system utilizing a pin 50 and a connector 52 configured somewhat similarly to connector 24, but with significant differences. The connector 52 does not have a seat section similar to seat section 40, rather the pin 50 is nominally positioned at the intersection of slot 54 and exit gap 56. As in connector 24, when a sufficient tension load is applied on the belt 58 attached to the connector 52, the jaws 60a and 60b of the connector separate sufficiently to allow passage of the pin through the exit gap 56.

A significant difference between connector 52 of the prior art and connector 24 of the present invention is that in connector 52, the jaw 60 spread when tension loads are applied on belt 58 relative to pin 50, even though such loads are below the threshold load required for breakaway of the jaws 60 from the pin 50. Thus, as cyclical tension loads are applied to the belt 58, the jaws 60a and 60b are constantly spreading slightly and then closing to their nominal position thereby resulting in continual motion between the jaws and the pin 50 producing a rubbing action between. This rubbing action can cause gauling or other excessive wear of the pin 50 and/or jaws 60 thereby eventually resulting in a failure of the connector 52.

Applicant has discovered that the foregoing relative motion between the jaws 60 and pin 50 can be eliminated if a clamping preload is applied on the pin by the jaws. This is accomplished in the present invention, as described above. As a result, in the present invention, there is no relative movement between the jaws 34a and 34b and the pin 20 until almost the threshold tension force is applied to belt 12 causing the jaws 34 to separate for quick release of pin 20 from the jaws.

Figure 5:
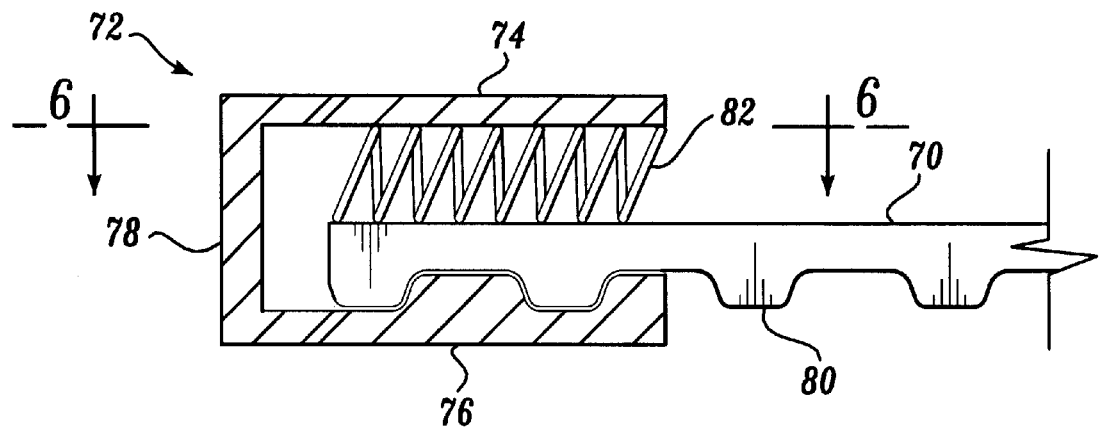
FIG. 5 is a partial cross-sectional view of an alternative embodiment of the present invention.
Figure 6:
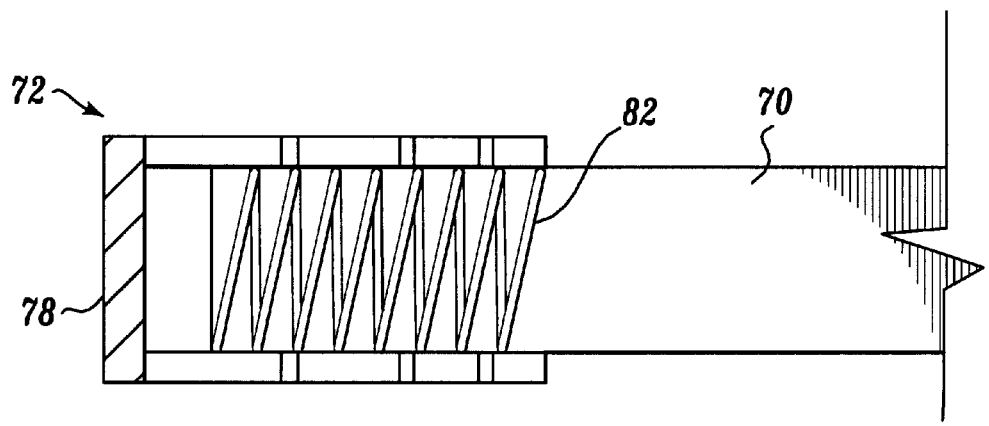
FIG. 6 is a cross-sectional view of FIG. 5 taken substantially along lines 6—6 thereof

An alternative embodiment of the present invention is illustrated in FIGS. 5 and 6 wherein the end portion of a belt 70 is attached to a connector 72 which in time can be integrated into or secured to a carriage or other member (not shown) to be driven by the belt. The connector 72 is generally C-shaped, having spaced apart top and bottom walls 74 and 76 connected by an end wall 78. The inside surface of the bottom wall 76 is contoured in the form of the transverse teeth 80 of the belt 70 so as to closely mate with the end of the belt 70. The end of the belt 70 is nominally maintained in an engagement within the connector 72 by a spring 82 generally in the form of a "flattened" coil spring so as to form an oval or elliptical shape when viewed from the end of the spring. The spring 82 is captured between the underside of top wall 74 and the adjacent backside of the belt 70.

In use, when the tension force on the belt 70 exceeds a threshold level, the sloped teeth of the timing belt 70 slide along the corresponding surfaces of the teeth of the connector thereby compressing the spring 82. The spring 82 has a non-linear response when compressed in the longitudinal direction. Thus, when the spring 82 is compressed sufficiently, it collapses in a catastrophic manner thereby allowing quick release of the belt 70 from the connector 72.

While preferred embodiments of the present invention, including the best mode of the present invention (FIGS. 2–4) have been described above, it is to be understood that modifications and variations can be made to those embodiments described above without departing from the spirit or scope of the present invention. For instance, rather than utilizing a timing belt, such as timing belt 12 illustrated above, the present invention can be used in conjunction with a flat belt, a cog belt, a V-belt or a tubular belt. Moreover, the present invention may be used in conjunction with tension transmitting members that are not belts, for instance, cables, ropes, lines and chains. Further, rather than having a round exterior shape, pin 20 can be formed in other cross-sectional shapes such as elliptical or oval. Moreover, in cross-section, the pin 20 can be of a polygon shape.

Rather than being limited to the foregoing embodiments or even to the alternatives posed above, the scope of the present invention is to be determined only by the broadest interpretation of the appended claims.

The embodiments of the invention in which an exclusive property or privilege is claimed are defined as follows:

1. A breakaway connector system for detachably connecting first and second elements loaded in tension relative to each other, comprising:
   (a) a pin mountable to the first element, the pin having an outer contour and size;
   (b) a clamp mountable to the second element, the clamp engaged with the pin, the clamp having a pair of spaced apart first and second jaws, the jaws cooperatively defining a tip portion, an entrance gap at the tip portion of the jaws, a base portion spaced from the tip portion and a seat portion located between the tip and base portions of the jaws, said seat portion being contoured to correspond to the outer contour and size of the pin for snugly receiving the pin therein, said seat portion having, portions abutting the pin to restrain the movement of the pin relative to the seat portion toward the lip portion and toward the base portion of the jaws, wherein the jaws impose a clamping preload on the pin of sufficient force to securely clamp the jaws against the pin and hold the pin stationary within the seat portion, the pin abruptly disengaging from the jaws of the clamp to disconnect the first and second elements from each other when the tension load between the first and second elements exceeds a preselected level.

2. The breakaway connector system of claim 1, wherein the pin outer contour has a round shape, and the seat defines a portion of a circle corresponding to a diameter of the pin.

3. The breakaway connector system of claim 1, wherein the base portion defines a gap of a width greater than a width of the pin for reception of the pin prior to engagement of the pin within the seat.

4. The breakaway connector system of claim 1, further comprising means for attaching the pin to the first element.

5. The breakaway connector system according to claim 1, further comprising means for attaching the clamp to the second element.

6. The breakaway connector system according to claim 1, wherein the second element is selected from a group consisting of a timing belt, a cog belt, a flat belt, a V-belt, a cable, a rope and a chain.

7. The breakaway connector system of claim 1, wherein the preload imposed on the pin by the clamp includes a significant component acting in the direction substantially perpendicular to the direction of the tension load acting between the first and second elements when the first element is detachably connected to the second element by the breakaway connector system.

8. A breakaway connector system for detachably connecting a driven member with a tension member, the tension member loaded in tension relative to the driven member, comprising:
   (a) a pin mountable to the driven member, the pin having an outer countour and size, and
   (b) a clamp mountable to the tension member, the clamp having a pair of spaced apart first and second longitudinal jaws, each jaw having an end portion spaced laterally apart from the end portion of the other jaw to define an exit gap therebetween and a seat portion spaced from the end portions of the jaws, said seat portion being contoured to correspond to the outer contour and size of the pin for snugly receiving the pin therebetween and said seat portion having portions abutting the pin to restrain the movement of the pin relative to the seat portion both toward and away from the end portions of the jaws under a clamping preload of the jaws, the jaws applying the clamping preload on the pin, the clamping preload having a significant force component in a direction substantially perpendicular to a direction of the tension load imposed on the driven member by the tension member when the driven member is detachably connected to the tension member by the breakaway connector system, such force component imposed on the pin by the jaws being of sufficient magnitude to hold the pin stationary within the jaws until the tension load between the pin and the clamp exceeds a preselected level, whereupon the pin abruptly disengages the jaws of the clamp by passing through the exit gap defined by the end portions of the jaws.

9. The breakway connector system of claim 8, wherein the jaws of the clamp define an entrance gap on the side of the seat portion opposite the exit gap for receiving the pin therein prior to engagement of the pin within the seat portion of the clamp.

10. The breakaway connector system according to claim 8, wherein the pin outer contour has a round shape and the seat of the clamp defines a portion of a circle of a size corresponding to a diameter of the pin.

11. The breakaway connector system of claim 8, further comprising means for attaching the pin to the driven member.

12. The breakaway connector system of claim 8, further comprising means for attaching the clamp to the tension member.

13. A breakaway connector system for detachably connecting first and second elements loaded in tension relative to each other, comprising:
   (a) a pin mountable to the first element;
   (b) a clamp mountable to the second element, the clamp nominally engaged with the pin, the clamp having a pair of spaced apart first and second jaws, the jaws cooperatively defining a tip portion, an entrance gap at the tip portion of the jaws, a base portion spaced from the tip portion and a seat portion located between the tip and base portions of the jaws, said seat portion contoured to correspond to the shape of the pin for snugly receiving the pin therein, said seat portion having portions abutting the pin to restrain the movement of the pin relative to the seat portion toward the tip portion and toward the base portion of the jaws, wherein the jaws impose a clamping preload on the pin of sufficient force to securely clamp the jaws against the pin and restrain nominal movement of the pin within the jaws until the tension load between the first and second elements exceeds a preselected level whereupon the pin abruptly disengages from the jaws of the clamp to disconnect the first and second elements from each other, the base portion defining a gap of a width greater than a width of the pin for reception of the pin prior to engagement of the pin within the seat.

\* \* \* \* \*

UNITED STATES PATENT AND TRADEMARK OFFICE
CERTIFICATE OF CORRECTION

PATENT NO.  : 5,988,927                    Page 1 of 2
DATED       : November 23, 1999
INVENTOR(S) : C.E. Pfarr It is certified that error appears in the above-identified patent and that said Letters Patent is hereby corrected as shown below:

COLUMN    LINE

| COLUMN | LINE | |
|---|---|---|
| 1 | 15 | "enumerous" should read --numerous-- |
| 1 | 33 | "innersection" should read --intersection-- |
| 1 | 35-36 | "separately" should read --separate-- |
| 2 | 18 | "define" should read --defines-- |
| 2 | 39 | "planned view" should read --plan view-- |
| 3 | 12 | before "clearance hole" insert --a-- |
| 3 | 45 | after "the belt 12," delete --to-- |
| 4 | 11 | "jaw 60" should read --jaws 60-- |
| 4 | 18 | "action between." should read --action therebetween.-- |

UNITED STATES PATENT AND TRADEMARK OFFICE
CERTIFICATE OF CORRECTION

PATENT NO. : 5,988,927
DATED : November 23, 1999
INVENTOR(S) : C.E. Pfarr

It is certified that error appears in the above-identified patent and that said Letters Patent is hereby corrected as shown below:

| COLUMN | LINE |  |
|---|---|---|
| 5 (Claim 1, | 25 line 15) | after "having" delete "." |

Signed and Sealed this

Twentieth Day of February, 2001

Attest:

NICHOLAS P. GODICI

Attesting Officer

Acting Director of the United States Patent and Trademark Office